United States Patent Office 3,055,109
Patented Sept. 25, 1962

3,055,109
CROWN FOR BOVINE TEETH
Ward C. Newcomb, Chappell, Nebr.
Filed Aug. 19, 1959, Ser. No. 834,831
4 Claims. (Cl. 32—12)

The present invention relates to a crown for bovine teeth and its manner of attachment thereto.

The invention is an improvement on my co-pending application Serial No. 794,613 filed February 20, 1959.

The useful life of a cow is controlled in many instances by the condition of the anterior teeth of the animal. The anterior teeth of the cow are used to crop the grass upon which the cow feeds so that as the anterior teeth become worn down the ability of the cow to crop grass is reduced until finally the cow is unable to obtain enough food to maintain herself in a healthy condition. It has been found that where there is an absence of wearing grit in the grass on which the cow is feeding, the anterior teeth have a much longer life and the useful life of the cow is extended in direct proportion to the life of the anterior teeth.

The primary object of the present invention is to provide a stainless steel crown for bovine anterior teeth having resilient means for maintaining the crown in position on the tooth while the securing cement is hardening.

Another object of the invention is to provide a crown for the anterior teeth of a cow wherein resilient means are provided for holding the crown to the tooth without requiring the use of tools or modifying the crown in any way.

A still further object of the invention is to provide a stainless steel crown for bovine teeth which can be applied to the bovine anterior teeth without injury thereto or discomfort to the animal.

Other objects and advantages will become apparent in the following specification when considered in light of the attached drawings, in which.

Figure 1:
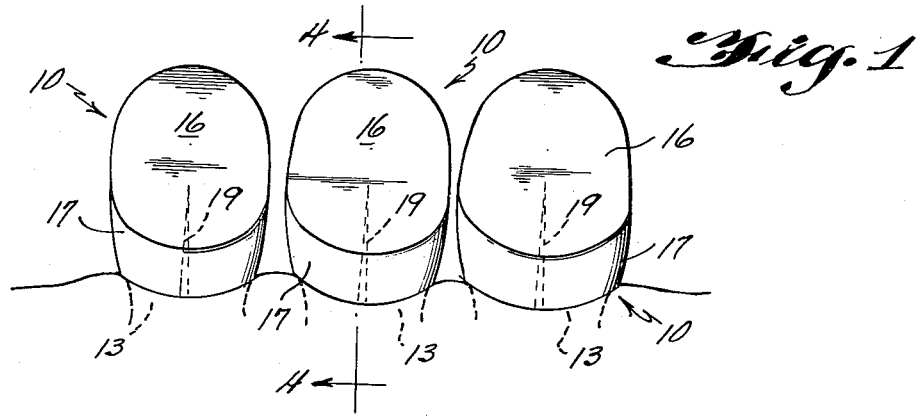
FIGURE 1 is a perspective view of a plurality of bovine anterior teeth having the invention mounted thereon, as viewed looking forward from inside the mouth.

Referring now to the drawings in detail wherein like reference characters indicate like parts throughout the several figures, the reference numeral 10 indicates generally a crown for anterior bovine teeth.

The crown 10 is illustrated as encompassing the upper portion 11 of an anterior tooth, generally indicated at 12. The anterior tooth 12 has a neck portion 13 extending into the gum 14. The neck portion 13 of the tooth 12 has a substantially smaller diameter than the upper portion 11 so that a shoulder 15 is formed therebtween extending circumferentally of the tooth and lying in a generally horizontal plane. The difference in size between the neck 13 and the upper portion of the tooth 12 producing the shoulder 15 occurs naturally in virtually all anterior bovine teeth, even though the upper portion 11 may vary in both size and shape.

Figure 2:
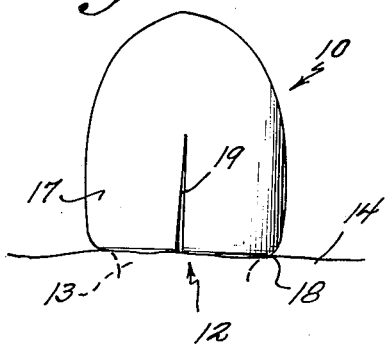
FIGURE 2 is a front elevation of the invention applied to a tooth.
Figure 3:
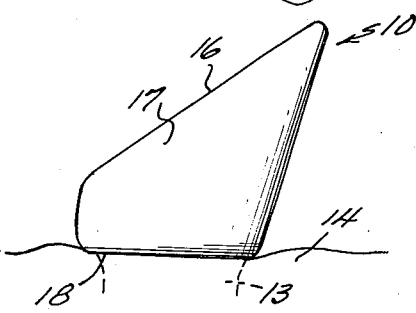
FIGURE 3 is a side elevation of the structure shown in FIGURE 2.
Figure 5:
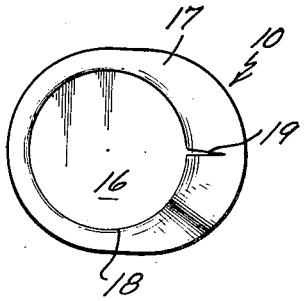
FIGURE 5 is a bottom plan view of the crown removed from a tooth.

The crown 10 includes a sloping top wall 16 having a substantially cylindrical wall 17 arranged in depending relation thereto. The depending wall 17 has an inturned lip 18 formed integrally thereon. The lip 18 extends circumferentially around the open lower end of the crown 10 and projects substantially inwardly from the plane of the generally cylindrical wall 17. An inverted V-shaped slot 19 extends in upright relation through the lip 18 and through the generally cylindrical wall 17 at the front of the crown 10. The slot 19 terminates intermediate the top wall 16 and the lip 18, as can be clearly seen in FIGURES 2 and 4.

The material from which the stainless crown 10 is formed is of a resilient nature and tends to assume its original shape when deformed. The slot 19 through the lip 18 and into the generally cylindrical wall 17 permits the lip 18 to be resiliently expanded to permit the crown 10 to be slid downwardly over the upper portion 11 of the tooth 12. The aforedescribed tendency of the resilient crown to assume its original form causes the lip 18 to engage beneath the shoulder 15 so as to tightly secure the crown 10 to the tooth 12. The V-slot 19 spreads apart a substantial distance at the lip 18 when applying the crown 10 to the tooth 12.

Figure 4:
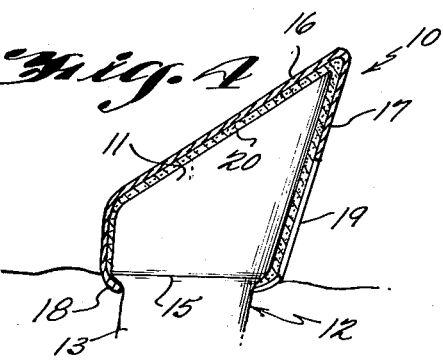
FIGURE 4 is a vertical sectional view taken along the line 4—4 of FIGURE 1, looking in the dierction of the arrows.

As can be seen in FIGURE 4, a conventional dental cement 20 is applied between the tooth 12 and the crown 10 so as to rigidly secure the crown 10 to the tooth 12 when the cement 20 has hardened. The cement 20 will also fill the V-slot 19 so as to completely seal the crown 10 to the tooth 12.

The crown 10 produces a neater, more positive fit with the tooth 12 than has been possible with the prior art devices, and by its use injury to the gum and teeth produced by crimping is completely eliminated.

It should be understood that while the invention has been described as being used with the anterior teeth of cows or bovines, it should be understood that it may also be used for other animal teeth having a similar form to the anterior teeth of bovines.

While the crown 10 has been disclosed as having a generally cylindrical wall 17 and a top wall 16, it should be understood that these walls will have a shape such as to conform generally to the shape of the anterior teeth of bovines and will be formed in various sizes as required.

Having thus described the preferred embodiment of the invention, it should be understood that numerous structural modifications and adaptations may be resorted to without departing from the scope of the appended claims.

What is claimed is:

1. A crown for an anterior bovine tooth of the type having an upper portion and a somewhat smaller neck portion extending downwardly therefrom to form a circumferential generally horizontal undercut shoulder comprising a stainless steel sloping top wall, a generally cylindrical depending wall integrally formed on the peripheral edges of said top wall, a radially inwardly projecting circumferential lip integrally formed on said generally cylindrical wall oppositely of said top wall, said lip and said generally cylindrical wall having an inverted V-shaped upright slot opening through the front thereof with said slot having its upper end terminating intermediate said top wall and said lip, said stainless steel crown being resilient whereby said lip may be circumferentially expanded by spreading said slot when mounting said crown on the upper portion of said tooth, said lip being adapted to resiliently engage beneath said undercut shoulder on said tooth to secure said crown to said tooth.

2. A crown for anterior bovine teeth of the type having an undercut shoulder comprising a cup shaped metallic tooth encompassing body and a resilient circumferential lip integrally formed on said body and extending inwardly for locking engagement under said undercut shoulder, said body and said lip having an inverted V-shaped slot formed in the front thereof to permit circumferential resilient spreading of said lip.

3. A device as claimed in claim 2 wherein said body is shaped to closely conform to the shape of the encompassed anterior tooth and cement means is provided interiorly of the crown for rigidly securing said crown to said tooth adapted to fill the space between said crown and said tooth.

4. A device as claimed in claim 2 wherein said crown is formed of integral resilient stainless steel and dental cement means is positioned within the crown and is adapted to fill the space between said crown and said anterior tooth for rigidly securing said crown thereto.

References Cited in the file of this patent

UNITED STATES PATENTS

| | | |
|---|---|---|
| 1,519,969 | Bechtold | Dec. 16, 1924 |
| 1,884,128 | Myerson | Oct. 25, 1932 |
| 2,165,466 | Erdle | July 11, 1939 |
| 2,219,058 | Streim | Oct. 22, 1940 |
| 2,746,148 | Jermyn | May 22, 1956 |

FOREIGN PATENTS

| | | |
|---|---|---|
| 425,672 | Germany | Feb. 22, 1926 |